(12) United States Patent
Fulleringer et al.

(10) Patent No.: US 10,557,767 B2
(45) Date of Patent: Feb. 11, 2020

(54) DEFORMATION—MEASURING TORQUE METER

(71) Applicant: SAFRAN HELICOPTER ENGINES, Bordes (FR)

(72) Inventors: Benjamin Fulleringer, Moissy-cramayel (FR); Armand Bueno, Moissy-cramayel (FR); Yannick Cazaux, Moissy-cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 0 days.

(21) Appl. No.: 15/568,264

(22) PCT Filed: Apr. 20, 2016

(86) PCT No.: PCT/FR2016/050916
§ 371 (c)(1),
(2) Date: Oct. 20, 2017

(87) PCT Pub. No.: WO2016/174330
PCT Pub. Date: Nov. 3, 2016

(65) Prior Publication Data
US 2018/0136059 A1     May 17, 2018

(30) Foreign Application Priority Data
Apr. 27, 2015   (FR) ...................... 15 53756

(51) Int. Cl.
*G01L 3/14* (2006.01)
(52) U.S. Cl.
CPC .................. *G01L 3/1457* (2013.01)
(58) Field of Classification Search
CPC ..... G01L 3/1457; G01L 3/1428; G01L 3/101; G01L 3/14
(Continued)

(56) References Cited

U.S. PATENT DOCUMENTS 3,581,562 A * 6/1971 Shorrock .............. G01L 3/1485
                                                                    73/862.37
4,182,168 A   1/1980 Desch
(Continued)

FOREIGN PATENT DOCUMENTS

| CH | 425 272 A | 11/1966 |
| CN | 101855531 A | 10/2010 |
| CN | 103743510 A | 4/2014 |

OTHER PUBLICATIONS

International Search Report and Translation dated Jul. 11, 2016, issued in corresponding International Application No. PCT/FR2016/050916, filed Apr. 20, 2016, 5 pages.
(Continued)

*Primary Examiner* — Lisa M Caputo
*Assistant Examiner* — Octavia Hollington
(74) *Attorney, Agent, or Firm* — Christensen O'Connor Johnson Kindness PLLC

(57)          ABSTRACT

A torque meter includes a casing and a part is configured to move in the casing in translation in a longitudinal direction under the effect of an axial thrust representative of the torque to be measured. The torque meter further includes a bearing surface connected to the casing via at least one of the ends thereof. The bearing surface extends at least partially in a plane that is substantially perpendicular to the longitudinal direction. One longitudinal end of the movable part is configured to be brought into contact with the bearing surface so that a longitudinal displacement of the movable part leads to a deformation of the bearing surface. The torque meter also has a device configured to measure the deformation of the bearing surface.

14 Claims, 2 Drawing Sheets

Figure 1:
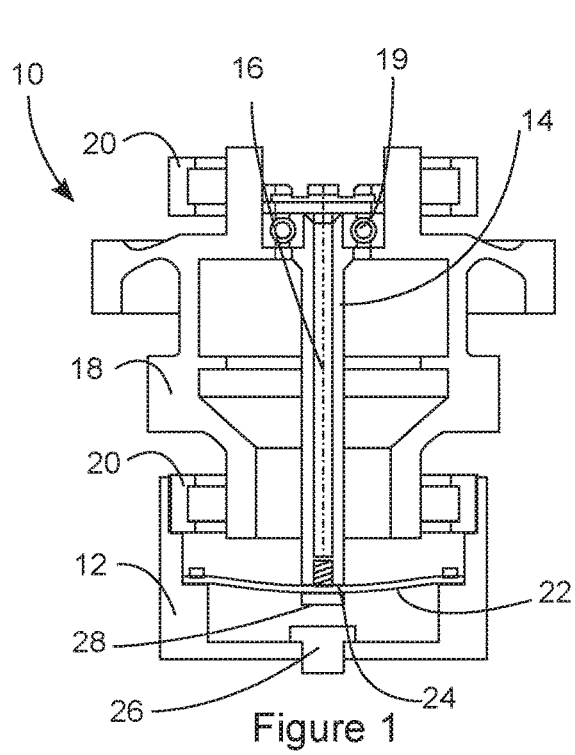

(58) Field of Classification Search
USPC .................................... 73/862.331–862.338
See application file for complete search history.

(56) References Cited

U.S. PATENT DOCUMENTS

| | | | | |
|---|---|---|---|---|
| 4,287,758 | A * | 9/1981 | Swearingen | F16C 17/04 384/307 |
| 4,782,696 | A * | 11/1988 | Suchoza | F04D 15/0088 73/168 |
| 5,182,953 | A | 2/1993 | Ellinger et al. | |
| 5,503,045 | A | 4/1996 | Riester | |
| 5,801,339 | A * | 9/1998 | Boult | G01G 17/08 177/261 |
| 5,886,268 | A * | 3/1999 | Larsson | G01L 1/083 73/862.49 |
| 7,971,490 | B2 * | 7/2011 | Fleury | G01L 5/12 73/760 |
| 8,839,682 | B2 * | 9/2014 | Trevisani | G01L 3/1478 73/152.49 |
| 9,714,883 | B2 * | 7/2017 | Lee | G01N 29/045 |
| 2003/0029251 | A1 | 2/2003 | Ueno | |
| 2003/0233888 | A1 * | 12/2003 | Gierling | G01L 3/1442 73/862.31 |
| 2010/0307218 | A1 | 12/2010 | Meuter et al. | |
| 2017/0261390 | A1 * | 9/2017 | Houssaye | G01L 3/1485 |

OTHER PUBLICATIONS

Written Opinion of the International Searching Authority dated Jul. 11, 2016, issued in corresponding International Application No. PCT/FR2016/050916, filed Apr. 20, 2016, 5 pages.
International Preliminary Report on Patentability dated Oct. 31, 2017, issued in corresponding International Application No. PCT/FR2016/050916, filed Apr. 20, 2016, 1 page.
"Thermal Parameter Measurement and Processing: the Second Edition," Chongde LV, Tsinghua University Press, p. 142.
Zhao, G., "Factory Applied Physics," People's Publishing Press of Yunnan, p. 71-72.
Office Action dated Jun. 28, 2019, issued in corresponding Chinese Application No. 201680022821.2, 17 pages.

* cited by examiner

DEFORMATION—MEASURING TORQUE METER

1. TECHNICAL FIELD OF THE INVENTION

The invention relates to a torque meter. In particular, the invention relates to a torque meter for measuring a torque of a transmission element of a turboshaft engine of an aircraft.

2. TECHNOLOGICAL BACKGROUND

Torque meters are torque-measuring devices that exist in multiple formats depending on the field of application, the equipment for which the torque must be measured and the degree of accuracy required. In the aeronautical field, hydraulic torque meters are commonly used. These torque meters operate, for example, by means of an intermediate helical-toothed gear, for which the torque applied results in an axial thrust proportionate to the torque to be measured. This axial thrust is applied to a piston connected to the intermediate gear. Another embodiment commonly encountered involves measuring the axial thrust of a ring gear of an epicyclic gear train, which is also proportionate to the torque to be measured. In more general terms, the measurement can be taken on any helical gear.

The movement of the piston according to the torque measured causes a pressure to be exerted on the oil in a measuring chamber supplied by a hydraulic circuit until a balance is reached between the pressure exerted by the piston on the oil and that exerted by the oil on the piston. The measurement of the pressure at this balance by a pressure sensor allows the measured torque to be deduced.

These hydraulic torque meters have the drawbacks of being sensitive to friction due to the use of sealing and bearing elements, to leaks caused by the ageing of the sealing elements, to the variation in oil viscosity, and to the temperature, etc. Therefore, the accuracy of hydraulic torque meters is not guaranteed and regular maintenance thereof is required. Moreover, a negative torque cannot be measured using such torque meters.

Other torque meters used include rotary torque meters comparing the phase angle of the shaft subject to the torque with a rotating shaft not subject to the torque. However, the accuracy of the torque measurement taken by rotary torque meters depends on the length of the shaft, which thus requires rotary torque meters to be particularly bulky in order to produce an accurate measurement. Moreover, the rotating shaft not subject to the torque, and used as a reference, represents an additional cost and weight for the system.

3. PURPOSES OF THE INVENTION

The purpose of the invention is to overcome at least some of the drawbacks of known torque meters.

In particular, the invention further aims to provide, in at least one embodiment thereof, a torque meter with reduced bulk.

The invention further aims to provide, in at least one embodiment, a torque meter that does not use any hydraulic elements requiring seal management.

The invention further aims to provide, in at least one embodiment thereof, an accurate torque meter.

The invention further aims to provide, in at least one embodiment thereof, a reliable torque meter that requires little maintenance.

The invention further aims to provide, in at least one embodiment, a torque meter that is suitable for measuring a negative torque.

The invention further aims to provide, in at least one embodiment, a torque meter that is not very sensitive to temperature variations.

4. DESCRIPTION OF THE INVENTION

For this purpose, the invention relates to a torque meter comprising a casing and a part mounted such that it can move in translation in the casing in a longitudinal direction under the effect of an axial thrust representative of a torque to be measured, characterised in that it comprises:
 a bearing surface connected to the casing via at least one of the ends thereof, extending at least partially in a plane that is substantially perpendicular to the longitudinal direction, one longitudinal end of said movable part, called a contact end, being suitable for being brought into contact with said bearing surface so that a longitudinal displacement of the movable part leads to a deformation of the bearing surface,
 means for measuring the deformation of the bearing surface.

A torque meter according to the invention therefore allows for the measurement of the torque of a transmission element of a transmission chain, for example a transmission shaft, without the use of a reference or power shaft or of hydraulic elements. A movable part moves in translation depending on the torque to be measured; this movable part causes a bearing surface to become deformed. The deformation of the bearing surface is therefore representative of the torque, and the measurement of this deformation can be used to determine the torque. The torque meter therefore occupies little space compared to a rotary torque meter and occupies an amount of space that is substantially less than or equal to a hydraulic torque meter, without requiring a hydraulic circuit, and thus without requiring associated sealing. The absence of any hydraulic circuit also eases maintenance.

The bearing surface is directly or indirectly connected to the casing via one of the ends thereof. One end of the bearing surface is, for example, one of the edges of the bearing surface. The contact end is preferably in contact with the bearing surface such that the deformation caused by the displacement of the movable part is maximised, in order to improve the accuracy of the deformation measurement.

Advantageously, the deformation of the bearing surface is an elastic deformation. Restricting the deformations of the bearing surface to an elastic domain allows the same measured torque to be obtained for the same measured deformation.

Advantageously and according to the invention, the means for measuring the deformation of the bearing surface comprise a proximity sensor, connected to the casing, oriented towards the bearing surface, and configured so as to measure the displacement of the bearing surface in the longitudinal direction.

The term displacement of the bearing surface is understood as referring to a modification to the position of at least one portion of the bearing surface.

According to this aspect of the invention, the displacement of the bearing surface in the longitudinal direction is caused by the flexion of the bearing surface in the longitudinal direction as a result of the displacement of the movable part. This displacement is therefore representative of the torque to be measured. The proximity sensor measuring the distance between itself and the bearing surface therefore allows for the measurement of said displacement corresponding to a variation in said distance.

Advantageously and according to said latter aspect of the invention, the proximity sensor can be an inductive proximity sensor.

According to this aspect of the invention, an inductive proximity sensor allows the displacement to be measured under good conditions by reducing the risks of the measurements being affected by the nature of the environment between the proximity sensor and the bearing surface. In particular, the measurement is not affected by the presence of gas, particles or oil, etc. between the proximity sensor and the bearing surface, such presence being possible when using the torque meter in a turboshaft engine. The inductive proximity sensor detects the distance to a metal object; the bearing surface, in this embodiment, must therefore be made from metal or comprise at least one metal part towards which the proximity sensor is oriented.

Advantageously, the proximity sensor is an Eddy-current inductive sensor.

Inductive proximity sensors, in particular Eddy-current sensors, are very accurate and highly reliable, thus providing an accurate and reliable value of the torque to be measured.

Advantageously and according to the invention, the contact end and the bearing surface are fixedly connected to each other by a fastener.

According to this aspect of the invention, the fastener secures the bearing surface to the movable part, thus allowing negative torque to be measured, regardless of the measuring means used.

Advantageously, when the proximity sensor is an inductive sensor, the fastener is made from metal and is oriented towards the proximity sensor. The proximity sensor therefore measures the distance between itself and the metal fastener in order to deduce the deformation of the bearing surface.

Advantageously and according to the invention, the means for measuring the deformation of the bearing surface comprise at least one strain gauge, positioned on the bearing surface and suitable for measuring a value representative of the deformation of the bearing surface.

According to this aspect of the invention, the deformation of the bearing surface being representative of the torque to be measured, a measurement of this deformation can be used to determine the torque. In order to improve the accuracy and stability (in particular with regard to temperature) of the measurement, the one or more strain gauges can be connected to a Wheatstone bridge.

Advantageously, the deformation measured by the one or more strain gauges is a deformation caused by an extension or compression of the bearing surface as a result of a force exerted by the contact end of the movable part on the bearing surface.

Advantageously and according to the invention, the bearing surface is connected to the casing via a support made from a material that does not become deformed as a result of the temperature variations.

According to this aspect of the invention, the support minimises the influence of the temperature on the measurement of the deformation of the bearing surface, in particular when said measurement is obtained using a proximity sensor. The use of a support that is separate from the casing further eases maintenance, whereby the support can be replaced, thus preventing the need to replace the entire casing. Invar is one example of such a material that does not become deformed as a result of the temperature variations.

Advantageously and according to the invention, the bearing surface is made from a material, the Young's modulus of which is not very sensitive to temperature variations.

According to this aspect of the invention, the deformation of the bearing surface measured by the deformation-measuring means does not depend on the temperature of the bearing surface. Elinvar is one example of such a material, whose Young's modulus is not very sensitive to temperature variations. The Young's modulus therefore varies by ±1% at most, depending on the composition of the material used, within the temperature interval to which the torque meter is subjected.

Preferably, the bearing surface is made from a material, the Young's modulus of which does not vary according to temperature, in the temperature interval to which the torque meter is subjected.

Within the scope of using the torque meter in a turboshaft engine, the temperature variations in the torque meter can be high. The torque measurement must therefore take into account these temperature variations, in this case by reducing the effects of these variations.

Advantageously, a torque meter according to the invention comprises temperature-measuring means.

According to this aspect of the invention, the temperature measurement taken by the temperature-measuring means is used to detect possible temperature variations that could result in variations to the torque measurement. The torque value is therefore adjusted to take into account the temperature value measured.

Within the scope of using the torque meter in a turboshaft engine, the temperature variations in the torque meter can be high. The torque measurement must therefore take into account these temperature variations, in this case by compensating for the effects of these variations.

The invention further relates to a turboshaft engine comprising a transmission element, characterised in that it comprises a torque meter according to the invention, mechanically connected to the transmission element so as to be able to measure the torque applied to the transmission element.

The transmission element can be, for example, a shaft, or a gear with internal or external helical toothing, etc. The torque measured is therefore the torque flowing through the transmission that comprises the transmission element.

The invention further relates to a torque meter and a turboshaft engine jointly characterised by all or part of the characteristics disclosed hereinabove or hereinbelow.

5. LIST OF FIGURES

Figure 2:
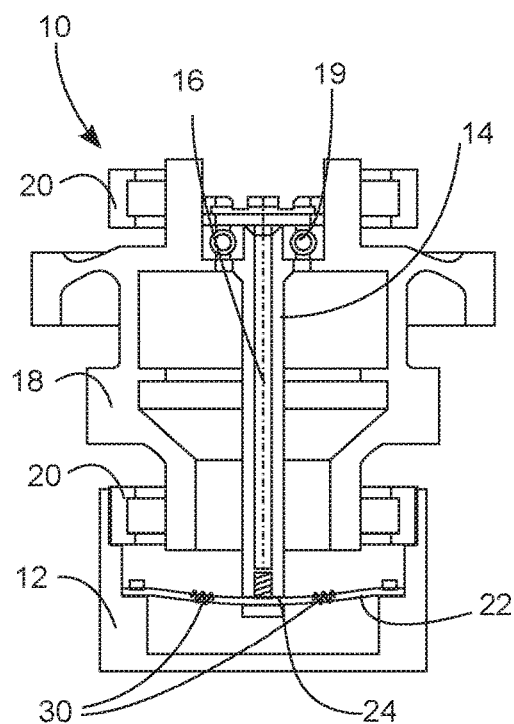
Figures 3A, 3B, 3C:
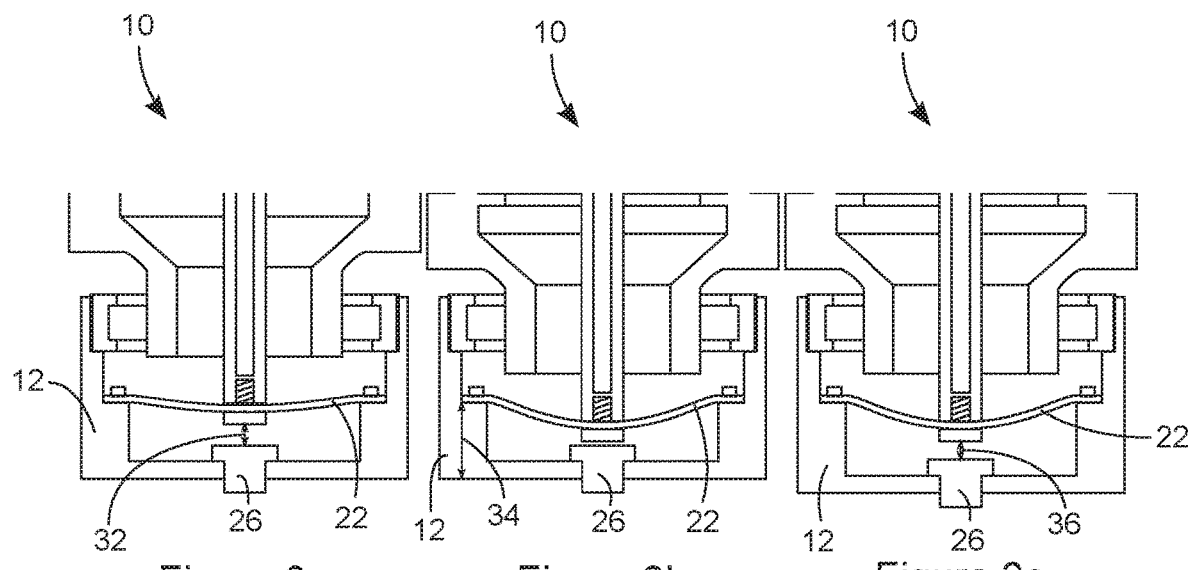
Figure 4:
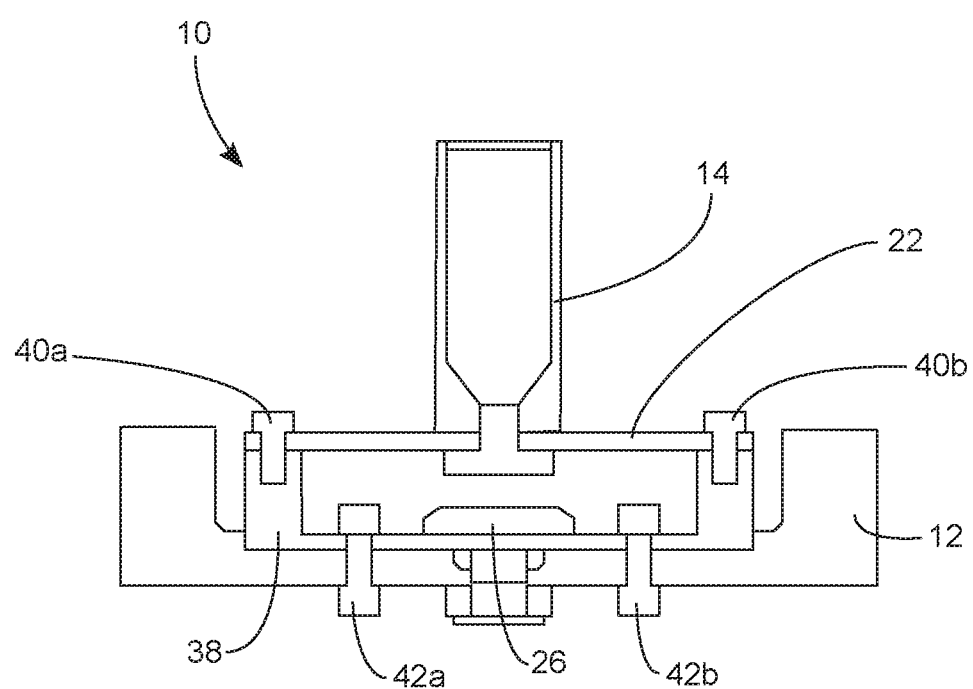

Other purposes, characteristics and advantages of the invention will be better understood upon reading the following description which is not intended to limit invention and given with reference to the appended figures, in which:

FIG. 1 is a diagrammatic sectional view of a torque meter according to one embodiment of the invention, FIG. 2 is a diagrammatic sectional view of a torque meter according to a second embodiment, FIG. 3a is a diagrammatic sectional view of a part of a torque meter according to one embodiment of the invention, measuring a torque C, at a temperature of 0° C., FIG. 3b is a diagrammatic sectional view of a part of a torque meter according to one embodiment of the invention, measuring a torque C, at a temperature of 150° C. and comprising a temperature-sensitive bearing surface and a casing that is not sensitive to temperature variations, FIG. 3c is a diagrammatic sectional view of a part of a torque meter according to one embodiment of the invention, measuring a torque C, at a temperature of 150° C. and comprising a casing and a bearing surface that are sensitive to temperature variations, FIG. 4 is a diagrammatic sectional view of a torque meter according to a third embodiment of the invention.

6. DETAILED DESCRIPTION OF ONE EMBODIMENT OF THE INVENTION

The following embodiments are examples. Although the description refers to one or more embodiments, this does not necessarily mean that each reference relates to the same embodiment, or that the characteristics apply only to a single embodiment. Simple characteristics of different embodiments can also be combined in order to provide other embodiments. For illustration and clarity purposes, the scales and proportions are not strictly respected in the figures.

FIGS. 1 and 2 diagrammatically illustrate a sectional view of a torque meter 10 according to a first and second embodiment of the invention. The torque meter 10 comprises a casing 12, in which can move a part 14 capable of moving in translation. The translational displacement of the movable part 14 takes place in a longitudinal direction, in this case parallel to an axis 16 of the movable part. In the views in FIGS. 1 to 4, the movable part 14 therefore moves in a downwards or upwards direction. The torque meter 10 is advantageously used to measure the torque of a shaft rotating in a turboshaft engine of an aircraft.

The movable part 14 is connected to a gear 18 provided with one or more helical toothings, via bearings 19. The torque applied to the gear 18 transmits a thrust to the movable part 14, thus driving the displacement thereof. The translational displacement of the movable part 14 is therefore representative of the torque to be measured. The gear 18 is connected to the casing 12 via bearings 20, the bearings 19 and the bearings 20 allowing the movable part 14 and the gear 18 to be displaced in the longitudinal direction, as well as allowing the movable part 14 to rotate about the axis 16.

The torque meter comprises a bearing surface 22, connected to the casing 12 by at least one of the ends thereof, and extending along a plane that is substantially perpendicular to the longitudinal direction. For example, the bearing surface 22 can be an elongated plate, the length of which is greater than the other dimensions (and is therefore similar to a beam), the two ends of which are connected to the casing. The bearing surface 22 can also be a diaphragm, in particular a circular diaphragm, all of the peripheral points of which are considered to be ends and are connected to the casing 12.

The bearing surface 22 is in contact with one end of the movable part 14, called a contact end 24. The displacement of the movable part 14 thus causes a deformation of the bearing surface 22. In particular, given that the bearing surface 22 is connected at one of the ends thereof to the casing 12 and extends substantially perpendicular to the longitudinal direction, the deformation of the bearing surface 22 is in particular represented by a displacement of the bearing surface 22 and an extension or compression of the bearing surface 22. The deformation resembles a flexion of the bearing surface 22, whereby the ends of the bearing surface 22 remain fixed relative to the casing 12, and the part of the bearing surface 22 in contact with the contact end 24 is subjected to the force exerted by the movable part 14 as a result of the displacement thereof, said force being substantially perpendicular to the plane in which the bearing surface 22 extends.

In order to measure this deformation of the bearing surface 22 and thus determine the torque to be measured, the torque meter 10 comprises means for measuring the deformation of the bearing surface 22.

According to a first embodiment, shown in FIG. 1, the means for measuring the deformation of the bearing surface 22 comprise a proximity sensor 26, also called a proximeter, allowing the distance between itself and the bearing surface 22 to be measured. Depending on the torque to be measured, this distance varies as a result of the displacement of the bearing surface 22 in the longitudinal direction. The comparison between the distance measured when applying a torque and the distance measured when no torque is applied can be used to determine the displacement of the bearing surface 22. The torque meter 10 can further comprise a fastening 28 for fixedly connecting the movable part 14 to the bearing surface 22. In this case, the proximity sensor 26 can measure the distance between itself and the fastening 28, instead of the bearing surface 22, which does not affect the torque measurement, which is based on the difference between the distances measured with or without torque.

The proximity sensor 26 is advantageously an inductive-type proximity sensor, as this type of sensor is little affected by the environment between the bearing surface 22 and the proximity sensor 26. In particular, when using the torque meter 10 in a turboshaft engine, the environment can comprise hot gases and oil. An inductive proximity sensor measures the distance between itself and a metal element; therefore, either the bearing surface 22 or the portion of the bearing surface 22 towards which the proximity sensor 26 is oriented must be made from metal, or, if the torque meter 10 comprises a fastening 28 connecting the bearing surface 22 to the movable part 14, this fastening 28 can be made from metal and the proximity sensor 26 is therefore oriented towards the fastening 28.

In practice, for example for a torque meter used in a turboshaft engine, the distance between the proximity sensor 26 and the bearing surface 22 (or the fastener 28) is less than 10 mm. The difference in the displacement of the bearing surface 22 between the minimum torque to be measured and the maximum torque to be measured is about 0.3 mm. The proximity sensors conventionally used can measure over a 1 mm interval with a sensitivity of about 0.1 μm.

According to a second embodiment, shown in FIG. 2, the means for measuring the deformation of the bearing surface 22 comprise at least one strain gauge 30, or two in this example, used to measure the deformation of the bearing surface 22, in particular the deformation caused by the extension or compression of the bearing surface 22 as a result of the displacement of the movable part 14.

A strain gauge, also called a strain meter, is generally constituted from a conductive part, the electrical resistance of which varies according to the deformation of the part. The part is constituted from a long, folded electrical track forming a grid or turn. The variation in electrical resistance of the conductive part is representative of the deformation of the strain gauge.

The proximity sensor 26 of the first embodiment and the one or more strain gauges 30 of the second embodiment can be used singly or in combination to allow, for example, the results of the deformation measurements to be correlated and thus improve the torque measurement.

The measurement of the deformation of the bearing surface 22 is sensitive to the variations in the temperature of the torque meter 10. In particular, the bearing surface 22 and the casing 12 are capable of being deformed in the event of a temperature variation, said deformation being thus additional to the deformations caused by the movable part 14. Moreover, the temperature variations can also affect the measurements obtained by the deformation-measuring means. There are several options available for overcoming these problems. These options can in particular be combined.

For example, one option that applies to all of the embodiments, involves adding a temperature-measuring means to the torque meter 10. The temperature is thus known, and the deformation measurements taken can be corrected as a function of the temperature measured.

With regard to the second embodiment shown in FIG. 2, in order to reduce the effects of the temperature variations on the strain gauges 30, the strain gauges are connected such that they form a Wheatstone bridge (not shown).

FIGS. 3a, 3b and 3c diagrammatically illustrate a sectional view of a part of a torque meter 10 according to one embodiment, measuring a torque C, according to a plurality of temperature conditions. The torque meter 10 in this example is constituted from the same elements as those of the first embodiment.

FIG. 3a shows the torque meter 10 measuring a torque C, and is subjected to a temperature of 0° C. The movable part 14 exerts a force on the bearing surface 22, producing a deformation of the bearing surface 22. A proximity sensor 26 measures this deformation by determining the distance, shown by the double arrow 32, between itself and the bearing surface, or in this case the fastener.

FIG. 3b shows the torque meter 10 measuring the same torque C, and subjected to a temperature of 150° C. The casing 12 used on this torque meter is not sensitive to temperature variations; for example the distance represented by the double arrow 34 has not changed relative to the torque meter 10 in FIG. 3a. One material not undergoing a deformation when the temperature varies is, for example, Invar, an iron and nickel alloy (generally made of 64% iron and 36% nickel). The bearing surface 22 is sensitive to temperature variations; thus the bearing surface 22 becomes deformed in a different manner compared to the torque meter 10 shown in FIG. 3a, subjected to a temperature of 0° C. The difference in deformation is in particular caused by a variation in the stiffness of the bearing surface 22 as a function of the temperature. In this case, the distance between the proximity sensor 26 and the bearing surface 22 (or the fastener 28) is reduced for the same torque C. Therefore, the torque measurement must take into account the variation in the stiffness of the bearing surface 22, for example by measuring the temperature in order to compensate for this variation.

A casing 12 sensitive to temperature variations can also be used, as shown in FIG. 3c. Moreover, the casing 12 is also dimensioned so that the temperature variations are calculated such that at a defined torque, the distance measured by the proximity sensor 26 is the same, regardless of the temperature: the dilatation of the casing 12 in the event of a temperature rise increases the distance between the proximity sensor 26 and the bearing surface 22 (or the fastener) in order to compensate for the difference in the deformation of the bearing surface 22 as a result of the temperature rise. As shown in FIG. 3c, the distance represented by the double arrow 36 is the same as the distance 32 in FIG. 3a, for the same torque C measured by the torque meter, in order to reduce the measurement error at any other torque that is different from C.

FIG. 4 diagrammatically illustrates a sectional view of a third embodiment of the torque meter 10, wherein the torque meter 10 comprises a support 38 connecting the bearing surface 22 to the casing 12. In particular, the bearing surface 22 is connected to the support 38 by fastening means 40a, 40b, and the support 38 is itself connected to the casing 12 by fastening means 42a, 42b. The proximity sensor 26 is positioned on this support 38. Only the lower part of the torque meter 10 is shown.

In order to reduce the sensitivity of the torque meter to temperature variations, the support 38 is made from a material that does not become deformed in the event of a temperature variation, for example Invar, and the bearing surface 22 is made from a material, the Young's modulus of which varies very little in the event of a temperature variation, for example Elinvar, a nickel-steel alloy (generally 36% nickel, 12% chromium). Therefore, the deformations of the bearing surface 22 measured using the means for measuring the deformation resulting from the displacement of the movable part 14 are stable when the temperature to which the torque meter 10 is subjected varies.

The invention claimed is:

1. A torque meter comprising a casing and a part, called a movable part, mounted to move in translation in the casing in a longitudinal direction under the effect of an axial thrust representative of a torque to be measured, wherein the torque meter further comprises:
    a bearing surface connected to the casing via at least one end of the bearing surface, extending at least partially in a plane that is substantially perpendicular to the longitudinal direction, one longitudinal end of said movable part, called a contact end, being configured to be brought into contact with said bearing surface so that a longitudinal displacement of the movable part leads to a deformation of the bearing surface; and
    a device configured to measure the deformation of the bearing surface, wherein the device comprises at least one strain gauge, positioned on the bearing surface, configured to measure a value representative of the deformation of the bearing surface, and being positioned off-center from a longitudinal axis of the movable part.

2. The torque meter according to claim 1, wherein the device comprises a proximity sensor connected to the casing and oriented towards the bearing surface the device being configured to measure the displacement of the bearing surface in the longitudinal direction.

3. The torque meter according to claim 2, wherein the proximity sensor is an inductive proximity sensor.

4. The torque meter according to claim 3, wherein the proximity sensor is an Eddy-current inductive sensor.

5. The torque meter according to claim 1, wherein the contact end and the bearing surface are fixedly connected to each other by a fastener.

6. The torque meter according to claim 5, wherein the fastener is made from metal.

7. The torque meter according to claim 6, wherein the fastener is made from Invar.

8. The torque meter according to claim 1, wherein the bearing surface is connected to the casing via a support made from a material that does not become deformed as a result of temperature variations.

9. The torque meter according claim 1, wherein the bearing surface is made from a material, the Young's modulus of which does not vary as a function of the temperature.

10. The torque meter according to claim 9, wherein the bearing surface is made from Elinvar.

11. The torque meter according to claim 1, further comprising a temperature-measuring means.

12. A turboshaft engine comprising a transmission element and a torque meter according to claim 1, wherein the torque meter is mechanically connected to the transmission element to measure the torque applied to the transmission element.

13. The torque meter according to claim 1, wherein the at least one strain gauge is connected to a Wheatstone bridge.

14. The torque meter according to claim 1, wherein the at least one strain gauge is juxtaposed on the bearing surface.

* * * * *